July 7, 1925.

W. E. SCHENDEL 1,544,940

MACHINE FOR PRODUCING SEPARATING PARTITIONS FOR CARRYING FRAGILE OBJECTS

Filed Aug. 30, 1923 10 Sheets-Sheet 1

INVENTOR.
William E. Schendel
BY
Carlos P. Griffin
ATTORNEY.

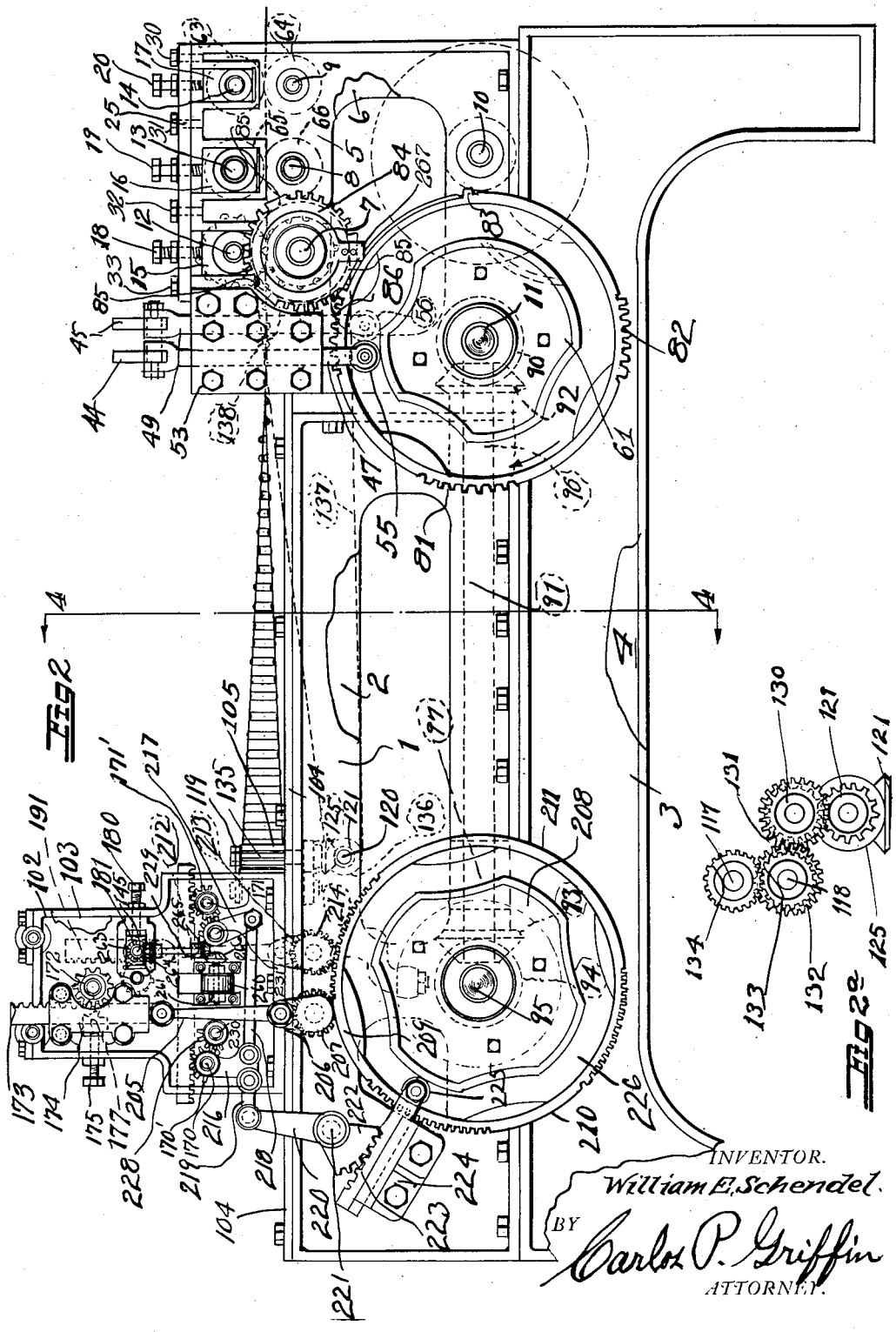

July 7, 1925. 1,544,940
W. E. SCHENDEL
MACHINE FOR PRODUCING SEPARATING PARTITIONS FOR CARRYING FRAGILE OBJECTS
Filed Aug. 30, 1923 10 Sheets-Sheet 3
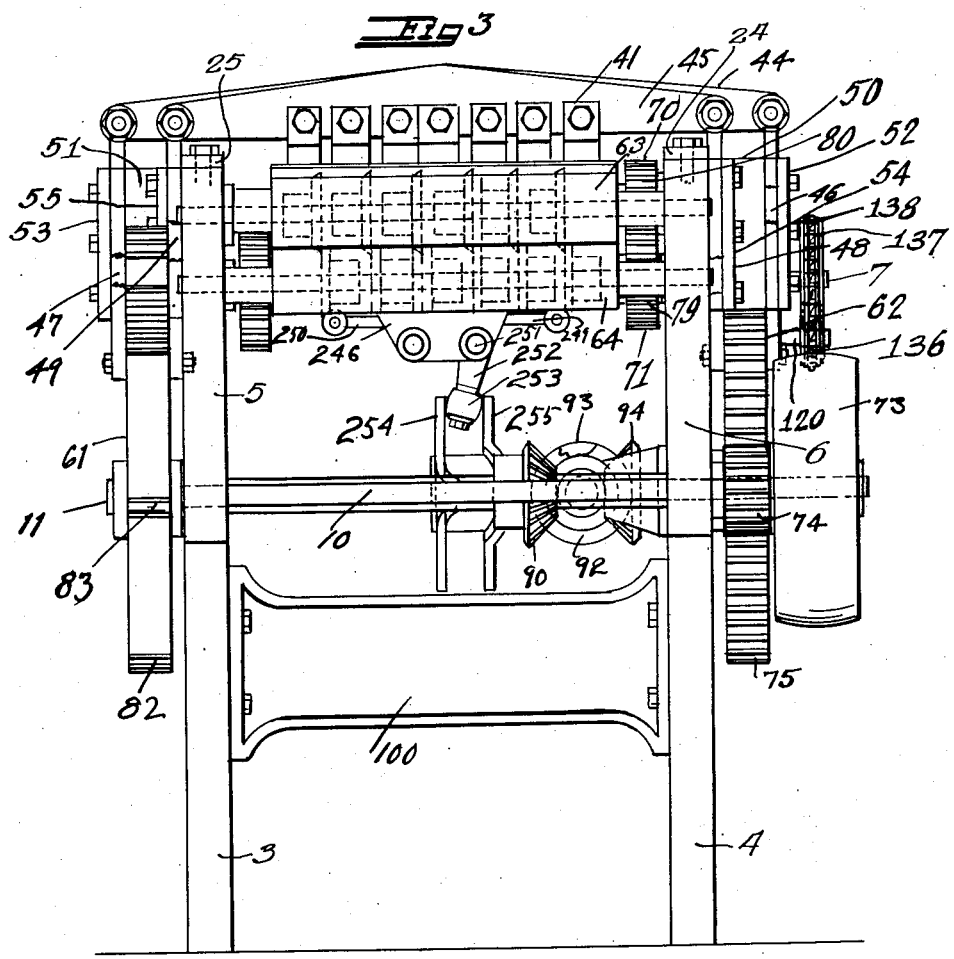
INVENTOR.
William E. Schendel.
BY
Carlos P. Griffin
ATTORNEY.

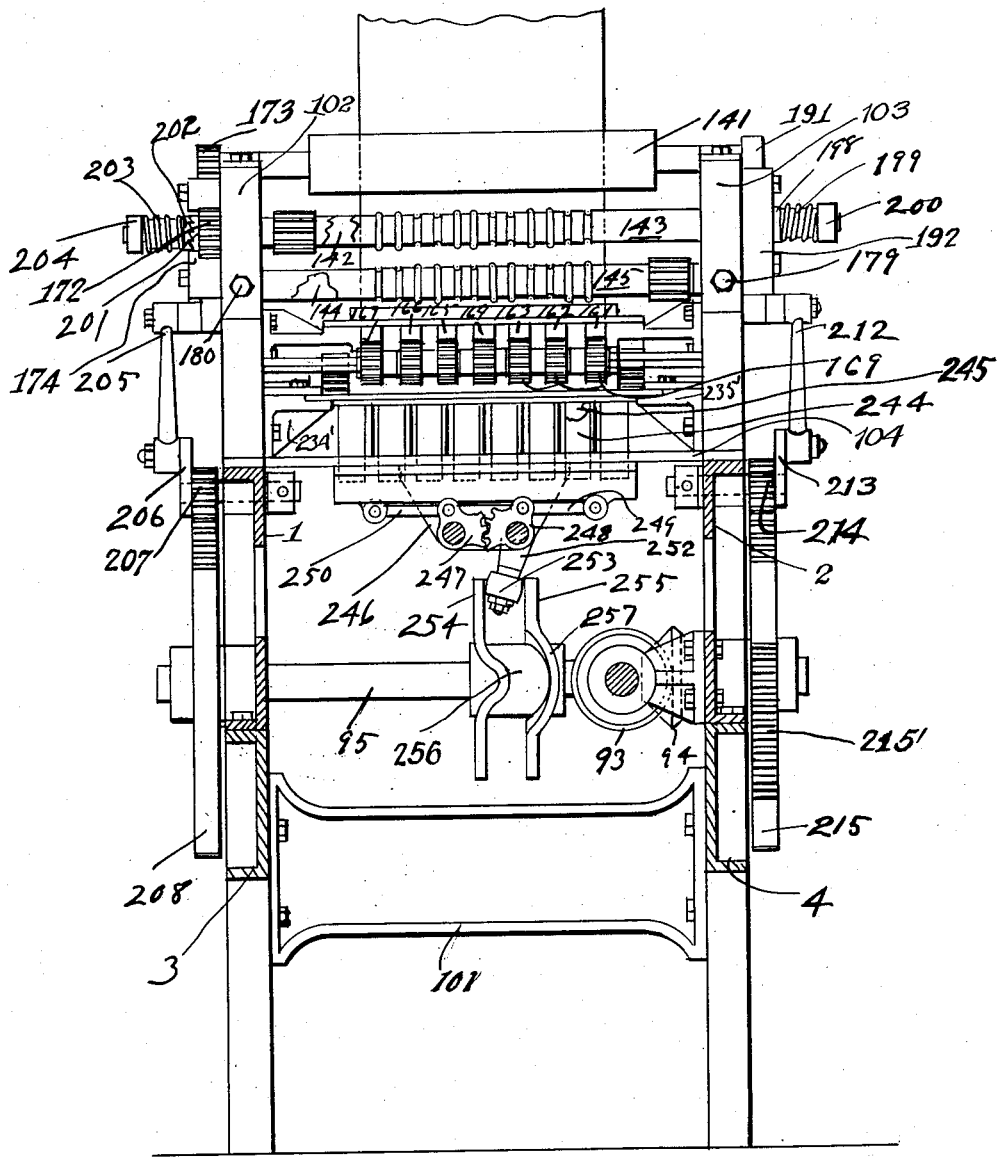

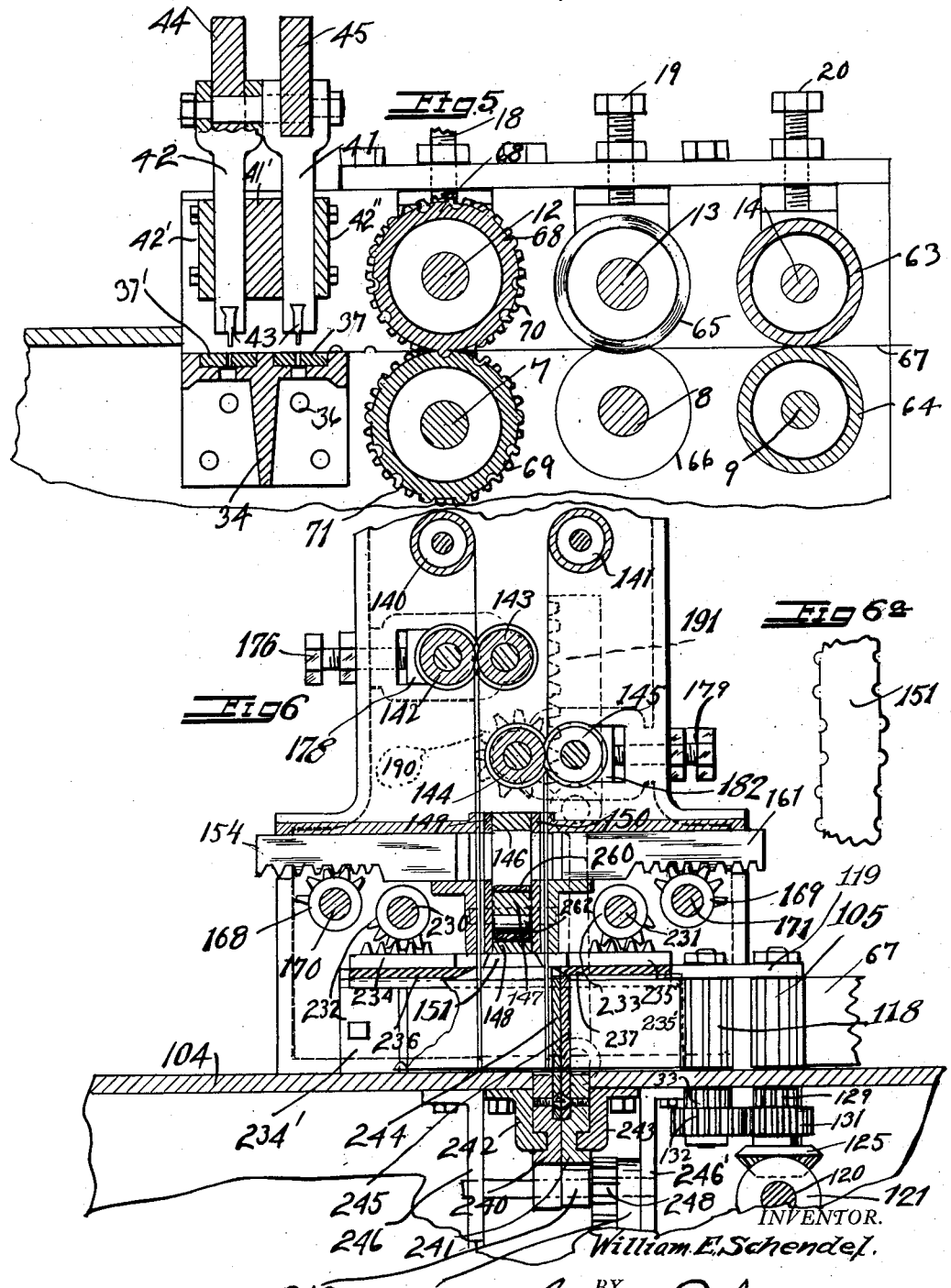

July 7, 1925.  
W. E. SCHENDEL  
1,544,940  
MACHINE FOR PRODUCING SEPARATING PARTITIONS FOR CARRYING FRAGILE OBJECTS  
Filed Aug. 30, 1923  10 Sheets-Sheet 6
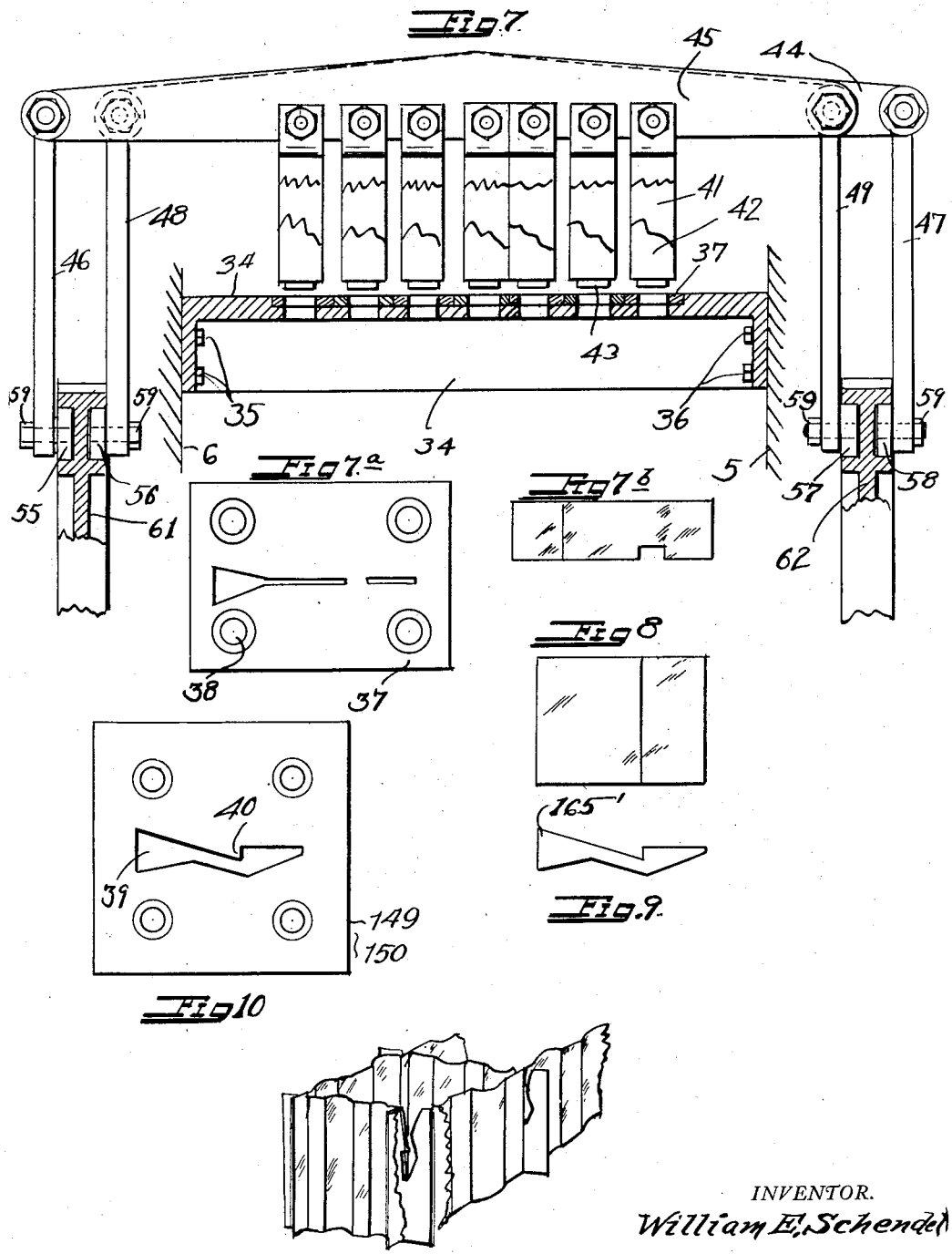
INVENTOR.  
William E. Schendel  
BY Carlos P. Griffin  
ATTORNEY.

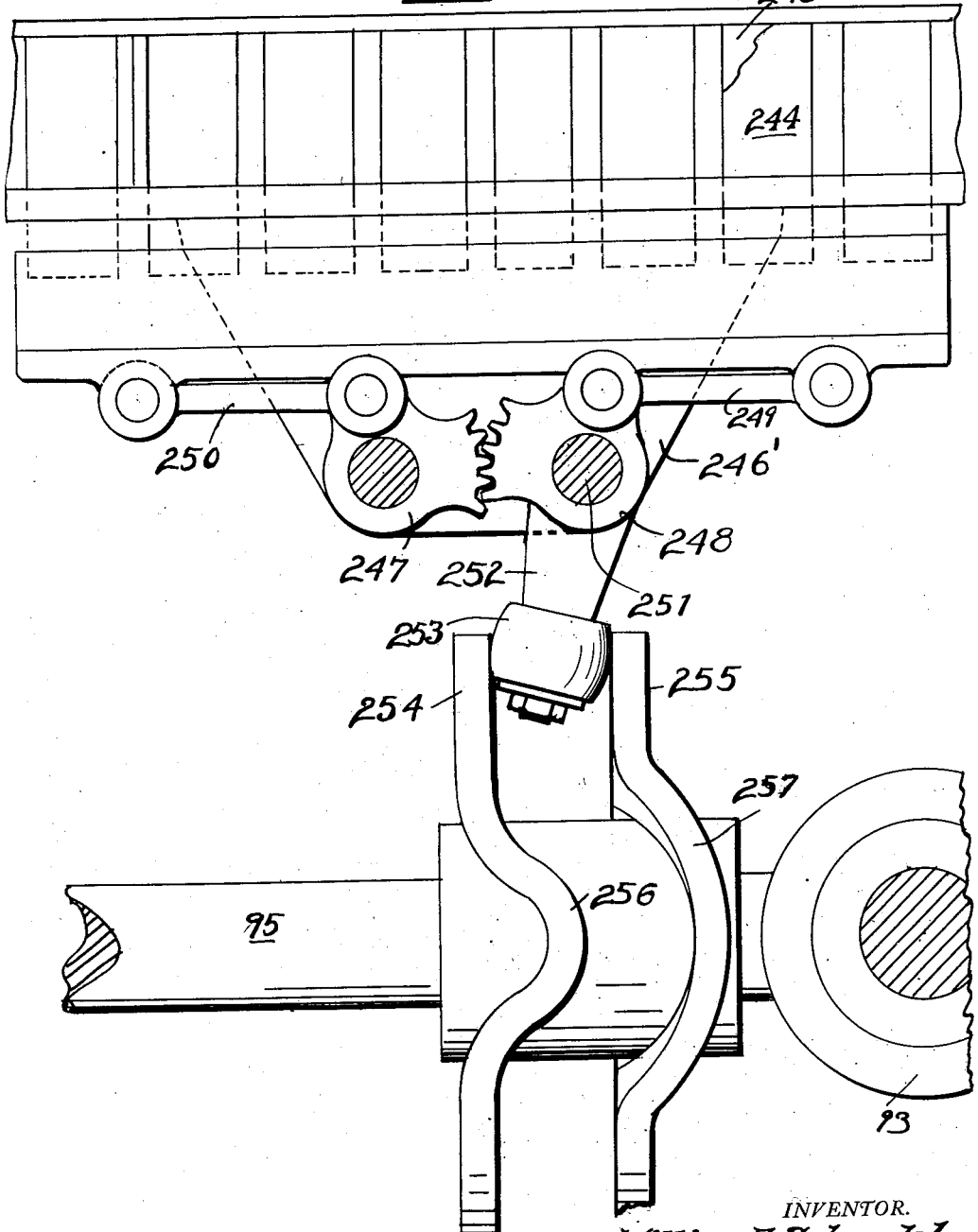

July 7, 1925. 1,544,940
W. E. SCHENDEL
MACHINE FOR PRODUCING SEPARATING PARTITIONS FOR CARRYING FRAGILE OBJECTS
Filed Aug. 30, 1923 10 Sheets-Sheet 8
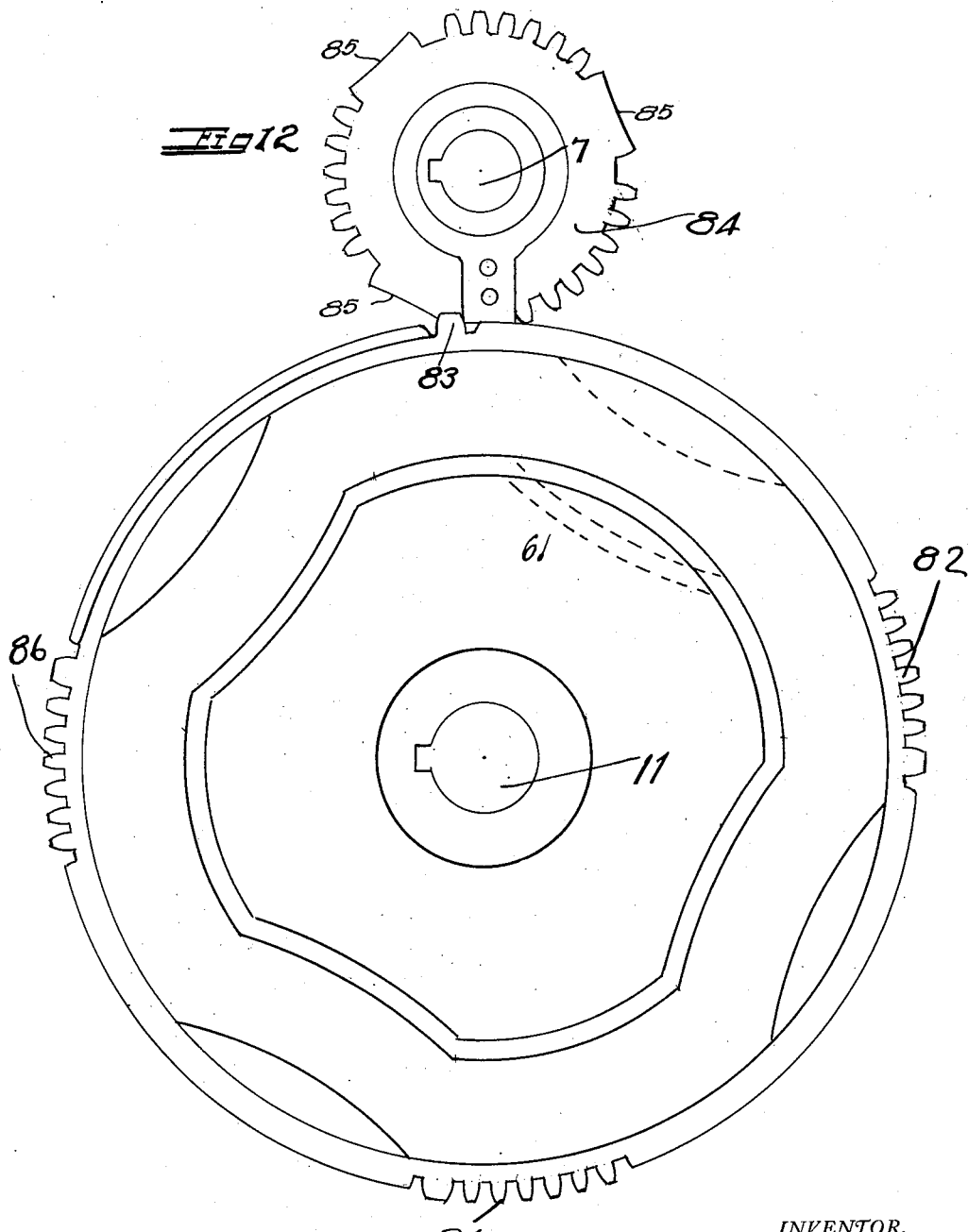
INVENTOR.
William E. Schendel.
BY
Carlos P. Griffin
ATTORNEY.

July 7, 1925. 1,544,940
W. E. SCHENDEL
MACHINE FOR PRODUCING SEPARATING PARTITIONS FOR CARRYING FRAGILE OBJECTS
Filed Aug. 30, 1923 10 Sheets-Sheet 9
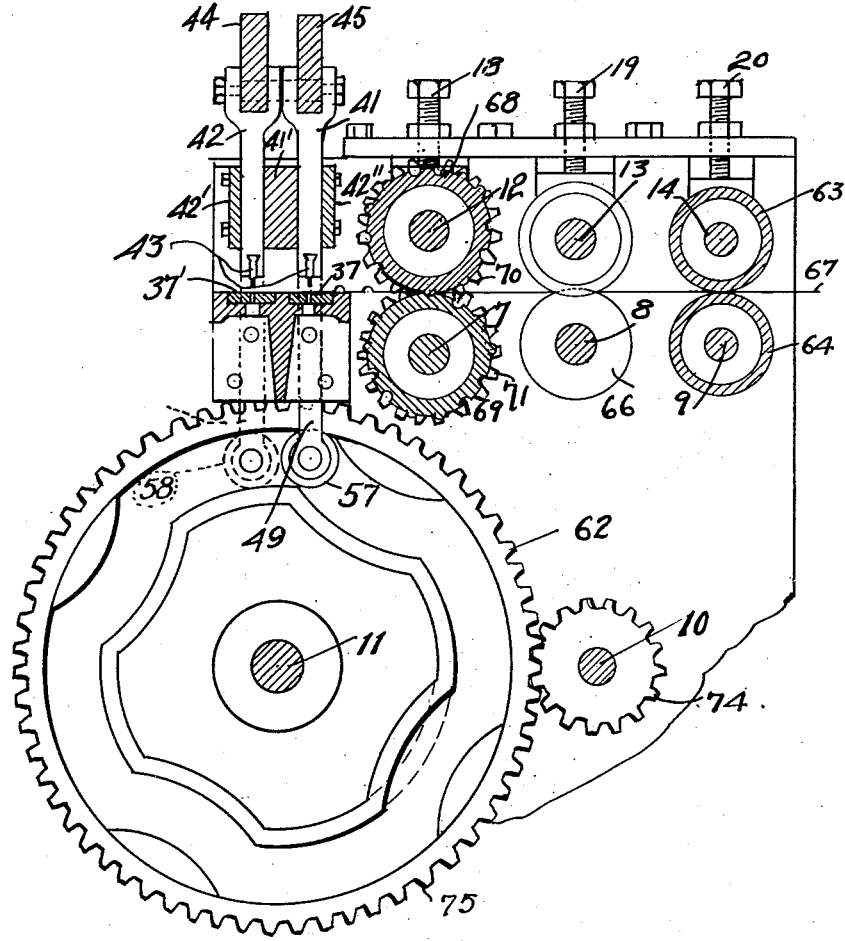
INVENTOR.
William E. Schendel.
BY Carlos P. Griffin
ATTORNEY.

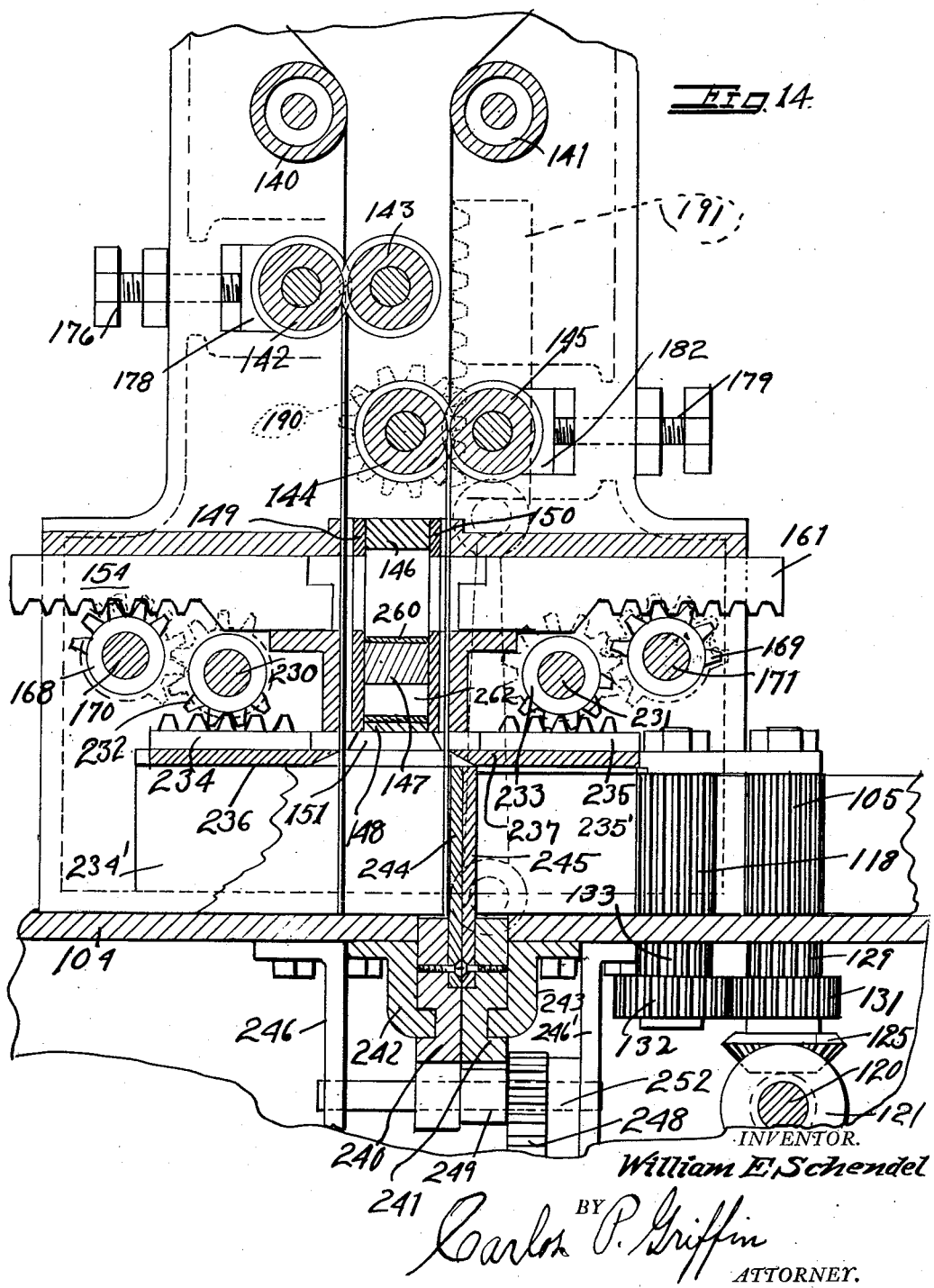

Patented July 7, 1925.

1,544,940

UNITED STATES PATENT OFFICE.

WILLIAM E. SCHENDEL, OF SAN FRANCISCO, CALIFORNIA.

MACHINE FOR PRODUCING SEPARATING PARTITIONS FOR CARRYING FRAGILE OBJECTS.

Application filed August 30, 1923. Serial No. 660,065.

*To all whom it may concern:*

Be it known that I, WILLIAM E. SCHENDEL, a citizen of the United States, residing at San Francisco, in the county of San Francisco, State of California, have invented a new and useful Machine for Producing Separating Partitions for Carrying Fragile Objects, of which the following is a specification in such full and clear terms as will enable those skilled in the art to construct and use the same.

This invention relates to a machine for producing separating partitions for carrying fragile objects, such as eggs, lamps or other fragile objects which must be packed in individual cells.

It will be understood by those skilled in the art that eggs, for example, are packed in cases which consists of wooden boxes filled with horizontal partitions and joined vertical partitions which produce a series of cells one for each egg, eggs being used as the most common example of this sort of packing although fruits, electric lamps or any other fragile objects may be packed in this manner with great facility.

With the present invention the joined sets of vertical partitions are corrugated in such a manner as to produce a cushion for each object.

Another object of the invention is to produce a series of corrugated partitions which will have the corrugations so arranged as to give the necessary cushioning effect and also arranged to nest with each other whereby the corrugations produced in a partition will not materially increase the size of the package produced when a series of these partitions are collapsed for shipment to the packing point, and the corrugations are also so formed as to nest in the manner just mentioned to avoid the destruction of the corrugations when the partitions are collapsed and packed for shipment.

It will be understood by those skilled in the art that the manufacturer, in the case of eggs for example, collapses the fillers and ships them to the point at which they are to be packed with the eggs to be carried in cases containing individual fillers to fill three cases of eggs and the corrugations must be so arranged that when so packed for shipment that the corrugations will not be injured by the collapsing.

Another object of the invention is to effect the punching of two of the vertically fed strips of paper, at one time, whereby the rate of operation of the punches may be reduced without reducing the capacity of the machine and to produce two rows of punchings in horizontally fed strips at a time, whereby fewer feeding movements of the paper strips are necessary although each movement is through a greater distance than if one set of holes is produced at a time.

Other objects of the invention will appear as the description proceeds.

An embodiment of the invention is shown in the accompanying drawings in which the same reference numeral is applied to the same portion throughout, but I am aware that there may be modifications thereof.

Fig. 2 is a side elevation of the complete machine,

Figure 1:
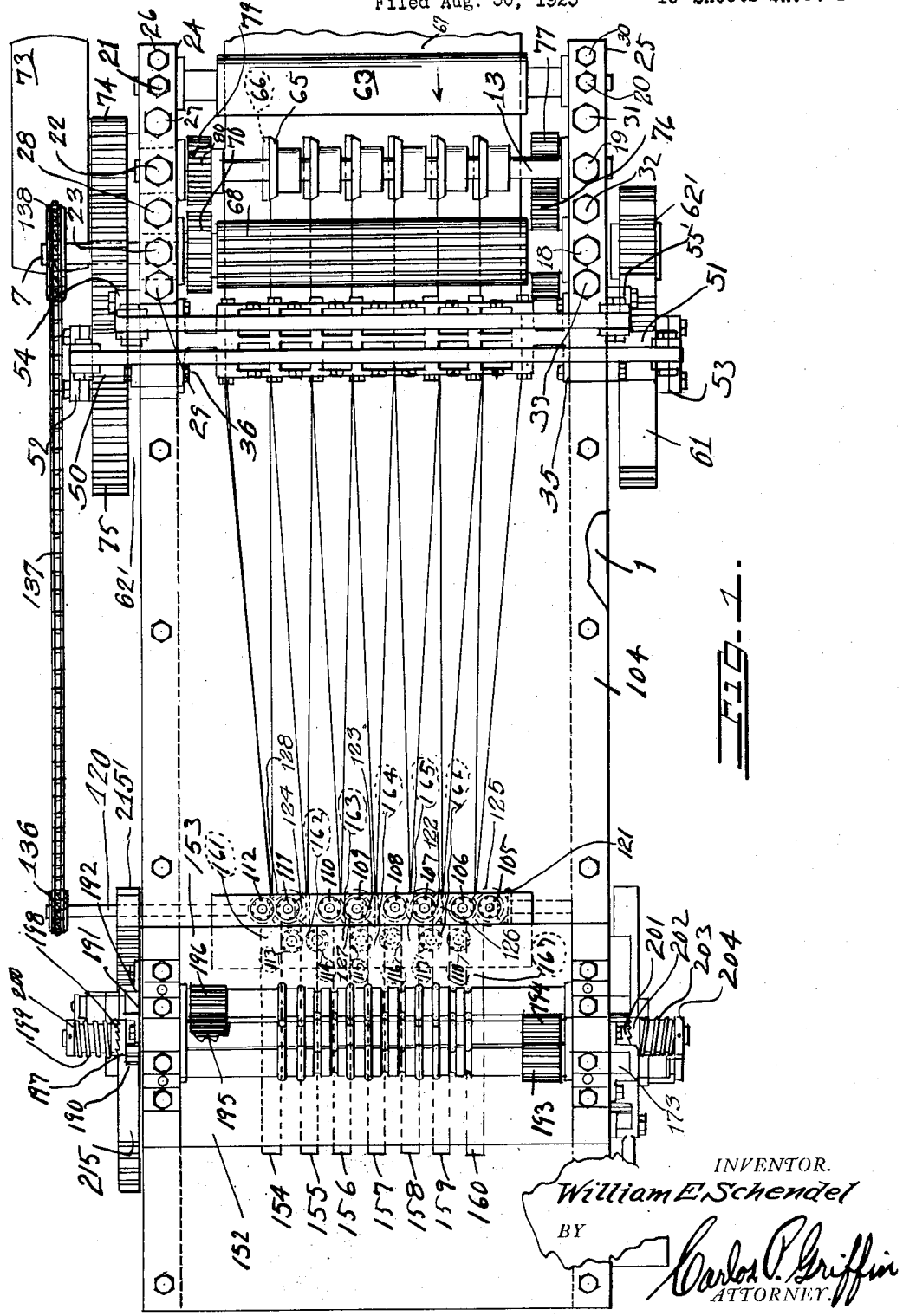
Fig. 1 is a plan view of the complete machine.

Fig. 2ª is a plan view of the gear system used for driving the secondary feed rolls for the horizontal feed strips, Fig. 3 is an end view of the complete machine looking from the right, Fig. 2, Fig. 4 is a vertical sectional view of the machine on the line 4—4, Fig. 2, looking in the direction of the arrows, Fig. 5 is a vertical sectional view of a portion of the machine adjacent the vertical moving punches, Fig. 6 is a vertical sectional view of a portion of the machine adjacent the horizontal moving punches, Fig. 6ª is a plan view of the horizontal cutting off knife, Fig. 7 is a view of the vertical die operating mechanism, Fig. 7ª is a plan view of one of the dies used in making the cuts in the strips fed into the machine horizontally, Fig. 7ᵇ is a side elevation of one of the knives used in conjunction with the die shown in Fig. 7ª, Fig. 8 is a side elevation of one of the punches used for cutting the slots in the strips which are fed vertically into the machine, Fig. 9 is a plan view of one of the punches shown in Fig. 8, Fig. 10 is a plan view of one of the dies used in conjunction with the punch illustrated in Figs. 8 and 9, Fig. 10ª is a perspective view of a portion of the made up filler illustrating the manner of locking one filler member in place with its cross members, Fig. 11 is a view of a portion of the machine on a larger scale than Fig. 4, showing the means for assembling one of the partitions with the remaining partitions of the set, Fig. 12 is a view on a larger scale of the stop gearing used for driving the punches, the cam on the back of the stop gearing being illustrated in dotted lines with its center offset slightly from the first cam for the purposes of illustration.

Fig. 13 is an enlarged vertical sectional view of the feeding and corrugating rolls for the horizontal strips and Fig. 14 is an enlarged vertical sectional view at the place in the machine where the horizontally fed strips are assembled with the vertically fed strips, only a portion of the machine being shown.

The frame of the machine is built right and left handed, each frame consisting of two members 1 and 2 resting upon the lower frame members 3 and 4 which latter frame members have extensions of convenient length to the floor or platform upon which the machine is mounted.

In addition to the foregoing members, the machine also has the frame members 5 and 6 in alignment with the members 1 and 2 and supported by the members 3 and 4 respectively.

The frame members are deeply flanged to give the necessary strength and they are provided, wherever necessary, with bosses to form the bearings for the several shafts of the machine.

The frame members 5 and 6 at the feed end of the machine carry shafts 7 to 11 inclusive which shafts extend entirely across the frame and which shafts are non-adjustable in their bearings.

The shafts 12 to 14 inclusive are revoluble in the adjustable bearings 15 to 17 inclusive, there being two of each of said bearings, and which bearings for each shaft are held down with such force as may be necessary, by means of the set screws 18 to 23 inclusive, said screws passing through the plates 24 and 25 on the top of the two frame members 5 and 6.

The plates 24 and 25 are held down by means of screws 26 to 33 inclusive. Connecting the two side frame members 5 and 6 there is a die supporting plate 34, said plate being bolted to the side members at 35, 36 and carrying a plurality of die plates 37 and 37'. The die plates 37 are square, as shown in Fig. 10, and are provided with four holes 38 to enable them to be secured on the die plate support 34 which latter has holes extending therethough to allow punchings to fall upon the floor. This die plate has a hole therein to produce a slot with a wide mouth at 39 and with a hook at 40, which will hold the cross filler member in place when the filler is assembled, as shown in Fig. 10ª.

The die plates are assembled on their supports in two separate lines, note 37, 37', Fig. 5, and there are two lines of punches 41 and 42, there being seven punches in each line, and each punch has one of the cutters 43 projecting from its lower end.

The cutters are shaped so that they fit snugly in the holes of the die plates 37. Each of the punches of the series 41 is carried by a cross-bar 44, while each of the series of the punches 42 is carried by the cross-bar 45. These bars are in turn supported by the links 46 and 47 and 48 and 49 respectively. Punches 41 and 42 move through slots in a cross-bar 41' and are held in place slidably in said slots by the removable plates 42' and 42''.

On the outside of the two frame members 5 and 6 are two projecting flanged brackets 50, 51, said flanged brackets forming guides for the rods 46 to 49 inclusive. The rods 46, 47 are retained in the vertical slot in which they move by means of the two plates 52, 53, while the two rods 48, 49 are retained in the vertical slot in which they move by means of the plates 54, 55' at the back of the two brackets 50, 51.

The lower ends of the rods 46 to 49 inclusive are provided with the rollers 55 to 58 inclusive which rollers are each retained in place by means of a suitable bolt, as illustrated at 59.

The rollers 56 to 58 extend into cam grooves of the stop motion wheels 61, 62, the operation of which will be later explained.

The shafts 9 and 14 carry the feed rolls 63, 64. The shafts 8 and 13 each carry six rotary cutting knives 65, 66 for the purpose of cutting the strip of paper 67 into seven strips, as indicated in Fig. 1.

The shafts 7 and 12 carry the corrugating rolls 68, 69, said shafts having the gears 70, 71 to drive them in unison from the small stop gear 84 on the end of the shaft 7.

The machine receives its power from a belt passing around the pulley 73 on the shaft 10 and a spur-gear 74 on said shaft engages the teeth 75 on the periphery of the cam gear 62.

The shaft 7 also carries a gear 76 which gear is in mesh with a smaller gear 77 on the shaft 8 and intermeshing gears 79, 80 serve to drive the shaft 13. The stop motion gears 61 and 62 are provided with inner and outer cam grooves to receive the rollers which operate the punch beams 44, 45, and each one is provided with a groove so shaped as to bring the punch beams down parallel to their initial position, such a number of times as to produce seven cuts in the corrugated paper with each complete cycle of the machine.

The cam gears 61 and 62 are each provided with flanges on the outside shaped to give the bar 44 three movements, and on the inside to give the bar 45 four movements with each revolution of the shaft 11, note Figures 12 and 13, which show the reverse sides of these gears. Similarly the gears 61 and 84 have teeth and stops to feed the paper forward in three double movements and one single movement with each turn of said shaft 11.

The teeth 75 on the wheel 62 drive the machine, while the several series of teeth 81, 82, 86 and the tooth 83 serve to properly time the rotation of the gear 84, and the shaft 7 to which said gear is connected. The direction of rotation is indicated on Fig. 2, by the arrow, and the result is to turn the gear 84 about five teeth, whereupon one of the three curved face stop lugs 85 comes into contact with the periphery of the gear 61 and thereby holds the apparatus out of motion during a certain period. As soon as the smooth periphery of the gear 61 comes into contact with the complementary part of the gear 84, that gear will stop and one of the punching operations will take place.

The preliminary step in the production of this packing material is the corrugation of the material, the cutting of the material into strips and the forming in the material of the desired slots to receive the cross-strips.

The apparatus just described constitutes the mechanism for slitting, corrugating and punching the strip of paper fed into the machine lengthwise and from which the corrugated and punched strips produced are led to the other end of the machine, where the strips are turned to an upright position and have the cross-strips applied thereto. This finishing end of the machine has its mechanism driven from the shaft 11 through the medium of a bevel gear 90, shaft 91 carrying bevel gears 92, 93 and bevel gear 94 on the shaft 95. The shaft 91 is carried by suitable bearings 96, 97 secured inside the frame member 1. In order to hold the frame members truly parallel there is provided a cross beam or strut 100, 101 at the ends of the frame, said struts being secured to the frame members 3 and 4.

At the finishing end of the machine there are two flanged side members 102, 103 which are secured to the top of the two frame members 1 and 2. These frame members are mounted upon the top of a horizontal plate 104 which plate extends from end to end and across the top of both of the frame members 1 and 2 openings therethrough being provided for the operating mechanism wherever necessary.

After the strips which are cut from the horizontal feed roll of paper are corrugated and punched, they are turned ninety degrees to pass through the rollers 105 to 118 inclusive. These rollers are arranged in two sets from 105 to 112 inclusive and from 113 to 118 inclusive, the spacing being such as to necessitate these rolls being placed in two banks. Each of these rolls has depressions to receive the corrugations of the paper strips and in order not to injure the corrugations, the depressions are placed so that whichever side the corrugations project upon will find a corresponding depression in a roll to receive it. These rolls are journalled in a plate 119 and also in holes in the plate 104, and they are driven from the shaft 120, said shaft carrying four bevelled gear wheels 121, 124 inclusive, said wheels being in mesh with four bevelled gear wheels 125, 128 inclusive on vertical shafts carrying the rollers 105, 107, 109 and 111.

The arrangement of the gears is such that each of the bevelled gear wheels on the shaft 120 drives four rollers except the last gear 124 which only drives two of the feed rollers. This gear system is illustrated in Fig. 2$^a$ and certain of the gears are also shown in Figures 6 and 14.

Describing only one of the gear systems for operating the secondary feed rolls for the horizontally fed corrugated strips, it will be seen that the gear 121 drives the bevelled gear 125 above which gear there is a spur gear 129 in mesh with a spur gear 130 on the adjoining roll shaft. That same shaft carries a gear 131 in mesh with the gear 132 on the shaft of the feed roll 118, and that shaft also carries a gear 133 in mesh with a gear of the same size 134 on the shaft of the feed roll 117.

The result of the construction just described is that the feed rolls 105, 106 and 117, 118 are driven to pull the horizontally fed paper strips through the machine, the pockets 135 of the feed rolls allowing sufficient space for the corrugations of the strips to pass without injury or flattening.

Since the feed rolls 105 to 118 must be driven at precisely the same speed as the feed from the corrugating rolls 68, 69, the shaft 120 is provided with a sprocket gear 136 around which passes a sprocket chain 137 driven from the shaft 7 and sprocket wheel 138.

The vertical feed paper strips pass over two guide rollers 140, 141 and then between the corrugating rollers 142, 145 inclusive, the rolls 143, 144 being arranged substantially in vertical alignment.

Below the roll 144 are three plates 146, 147, 148 which plates form the backing for the die plates 149, 150 and form the support to which the horizontal knife 151 is attached.

The knife 151 is attached to the underside of the bar 148 and it is shaped on both edges as indicated in Fig. 6ᵃ, to fit the corrugations of the paper strip which is fed past it.

Mounted on the frame of the machine between the two members 102, 103 are two grooved bars 152, 153, said bars receiving a plurality of plungers 154 to 167 inclusive, said plungers carrying the punches 165′, one on each plunger. Each of these plungers is provided with rack-teeth as indicated in Fig. 6, and each plunger meshes with a segment gear as indicated at 168, 169 said segment gears being carried by shafts 170, 171, which shafts extend entirely across the machine and are journalled in frames 102, 103.

The shaft of the roll 143 carries a gear 172 in mesh with a vertically movable rack-bar 173 which is held in a groove in the side of the frame 102 by means of a plate 174.

Screws 175, 176 bear upon movable bearings 177, 178 in which the roller 142 is journalled and serve to hold it against the roller 143 with such pressure as may be necessary. Similarly screws 179, 180 bear against movable bearings 181, 182 in which the roller 145 is journalled and serve to hold it against the roll 144 with sufficient force to properly corrugate the strips of paper.

The roller 144 has a gear 190 on one end of its supporting shaft, which gear is in mesh with a rack-bar 191 held against a groove in the side of the frame by means of a cover plate 192, this plate allowing the rack-bar to work vertically to operate the rollers 144, 145.

Gears 193, 194 cause the two rollers 142, 143 to operate in unison and the gears 195, 196 cause the two rollers 144, 145 to work in unison. The gear 190 is provided with ratchet clutch teeth on the face of its hub at 197, which clutch teeth engage complementary clutch teeth of a collar 198. The collar is slidable on the roller shaft and is held engaged with the clutch teeth of the gear 190 by means of a light spring 199, a fixed collar 200 holding it in place.

The gear 172 has clutch teeth on the face of its hub 201 which clutch teeth engage complementary clutch teeth on a collar 202, said collar being held engaged lightly with the hub 201 of the gear 172 by means of a spiral spring 203, said spiral spring being held in place by means of the fixed collar 204.

The object of the two clutches just described is to produce the desired intermittent downward movement of the two vertically movable strips of paper.

The rack-bar 173 is reciprocated vertically by means of pitman 205, said bar being connected to the crank 206 on the shaft of the spur gear 207. This spur gear 207 has a portion which engages the teeth of the intermittent cam gear 208 and another portion which engages the holding surfaces on the periphery of said gear, which are three in number, as indicated at 209, 210, 211.

The teeth of the cam gear 208 rotate the spur gear 207 exactly one turn and the smooth places on the perpihery of said gear 208 then hold the gear 207 during a portion of the rotation of the gear 208. The rack-bar 191 is operated by means of the pitman 212 from the crank 213, said crank being actuated in turn by the intermittent spur gear 214. The gear 214 is in mesh with the teeth of or held by the stop gear 215. The stop gear 215 has four movements to three movements of the stop spur gear 208, the extra set of teeth to accomplish this extra movement is shown at 215′ in Fig 4.

In order to cut off the vertical strips, it is arranged that the vertical strips shall be punched and then pushed down into assembly with the longitudinally moving strips, two at a time, until six have been assembled, after which the rack-bar 191 is operated to push another strip down into the assembled set of seven longitudinal strips and six cross strips.

The punch operating plunger 154 to 167 are operated by the gears 168, 169 thereunder and the shafts 170, 171 carrying said gears are operated by the two arms 216, 217. These arms are connected together by means of a link 218 and a link 219 connects the arm 216 with an arm 220 on the shaft 221, the latter shaft being operated by means of a segment gear 222 from the rack-bar 223. The rack-bar 223 is supported in a groove formed by the side of the machine and by a flanged bracket 224. The rack-bar 223 carries a roller 225 which is in mesh with the cam groove 226 of the wheel 208.

The shafts 170, 171 carry segment gears 170′, 171′ which are in mesh with segment gears 228, and 229. The segment gears 228, 229 are carried by the shafts 230, 231 each of which has two segment gears 232, and 233 thereon between the two frames for the operation of the cutter bars 234, and 235. These two cutter bars carry the straight knives 236 and 237 which operate against the outside edges of the cutting knife 151. The result of the construction just outlined is that the strain of punching the holes and cutting off two strips of paper is distributed by the shafts 170, 171, 230, 231 to the frame members 102, 103 thereby reducing the strain on the bars 146, 147, 148. The bars 234, 235 are supported by grooved brackets 234′ and 235′, and are slidable thereon.

It will also be noted that the bars 234, 235 operate in horizontal grooves of the two side members 102, 103.

In order to cut off the longitudinal movable strips of corrugated paper the slidable bars 240, 241 are provided. These bars are secured to the underside of the table member 104 by means of brackets 242, 243 and they are slidable transversely. These bars carry the vertical shearing plates 244, 245. These plates normally stand in a position between the several longitudinally movable strips of corrugated paper and the cut is made by moving each knife in an opposite direction a sufficient amount to sever the paper strip thereby preventing the position of the paper strip from being disturbed.

Depending from the underside of the plate 104 is a bracket 246. This bracket supports two segment gears 247, 248. One of these segment gears is connected by means of a link 249 to the slide bar 240, while the link 250 connects the segment gear 247 with the slide bar 241. The stop shaft 251 supporting the segment gear 248 has an arm 252 thereon which carries a roller 253 extending between two cam disks 254, 255. These cam disks have a curved portion at 256, 257 which causes the operation of the slide bars 240, 241 and attached knives each time a filler is completed and they are supported by and rotate with the shaft 95.

Between the plates 149, 150, there are two chambers into one of which the cardboard punchings are pushed and from which they are carried away by means of the endless belt 260, said belt passing around rollers 261, 262 at the sides of the machine. This belt is driven from the roller 145 by means of the bevelled wheels 263, 264, 265, 266, the object being to discharge the punchings at one side of the machine.

The operation of the machine is as follows:

Three wide strips of paper are used, one strip being fed into the machine horizontally through the feed rollers 63, 64, sliding knives 65, 66 and corrugating rollers 68, 69 to the preliminary punches.

The punches carried by the beams 44, 45 produce openings in the edge of each strip of cardboard and they produce one closed slot in the middle of the strip. (See die, Fig. 7ª.)

When egg case fillers are made the slots in the board are so placed that the egg case filler partitions will be one and three quarter inches apart. The corrugated strips are then passed through the vertical rolls 105, 118 receiving a quarter twist from the time they leave the punching operations.

The rolls 105 to 118 are driven at the same peripheral speed as the movement of the paper through the corrugating rolls, and they stop whenever the corrugating rolls stop, so that the paper is never stretched out of shape. These rolls are also fluted to receive the projecting corrugations of the paper strip without injury and without flattening, each roll of the set having recesses with no projection beyond the periphery of the roll. The corrugated strips are then fed into the space below the two knives 236, 237 and into the slots formed by the sets of knives 244, 245. (See Figs. 4 and 11). The other two strips of paper are fed vertically into the machine through the rollers 142, 143, 144, 145, said rollers corrugating the paper strips as required. The feeding operation is intermittent and during the period that the paper strips are standing still, the plungers, carrying the punches, are reciprocated to punch out the desired slot. During the return movement of the punches the paper strips are fed down another space and are partially engaged with the slots of the longitudinally extending paper strips. Immediately following the movement of the paper strip downwardly and during the time the next punching operation is taking place, the knives 236, 237 are advanced to cut off both paper strips and said knives serve to push the vertically movable paper strips down the thickness of the knife into place. When six of the vertically movable partitions have been assembled, one of the paper strips is held by the smooth gear face 211, and the other is caused to move downward one more stroke so that the completed product has seven strips in both directions, with six object recesses in both directions. Since this requires the advancing of the horizontal paper strips one space instead of two spaces, that movement is taken care of by the single tooth 267 of the gear 84 and momentarily thereafter the rollers 144, 145 are again operated to push down the final vertical strips.

The knives 236, 237 and the horizontally movable punches are moved back and forth during each operation, but will, of course, not interfere with any partition that has already been cut off and punched.

Once during each rotation of the shaft 95 the cam flanges 256, 257 will operate the lever 252 and this will operate the two intermeshing segment gears 247, 248 causing the transverse movement of the two bars 240, 241 which will, in turn, cause the two knives 244, 245 to cut off the length of the horizontally fed strips, and upon the next movement of the feed rollers of the machine the completed filler will be ejected therefrom by the ends of the partitions of the next filler.

What I claim is as follows, but modifications may be made in carrying out the invention shown in the drawings and in the above particularly described form thereof, within the purview of the invention as defined by the annexed claims.

1. A packing case filler machine, comprising feed rolls for strips of paper, means to corrugate the paper strips, means to assemble the corrugated paper strips in a rectangular formation, and means to cut off paper strips in predetermined lengths to carry a predetermined number of objects.

2. In a machine for producing packing case fillers, rolls to feed strips of paper into the machine, means to split, corrugate and punch one of the strips, means to corrugate, punch and cut off the other strips, means to assemble a predetermined number of the cut off strips with the corrugated strips previously mentioned and means to cut off predetermined lengths of the first strips with the connected corrugated strips assembled therewith.

3. A packing case filler machine, comprising feed rolls for a strip of paper, means to split the paper strips into a series of strips, means to corrugate the paper strips, means to punch slots therein and other means to feed and punch two strips of paper which are cut off and assembled with the first strips to produce a complete filler.

4. A packing case filler machine, comprising rolls for feeding a strip of paper, means to split the paper strips into a series of strips, means to punch a series of slots in the strips and other means to feed two strips of paper to feed and punch slots in two strips of paper which strips are cut off and assembled with the first series of strips.

5. A machine for producing packing case fillers, means to feed a series of strips of paper into the machine, means to punch two rows of slots in the paper strips at one time, means to feed two strips of paper into the machine at right angles to the line of movement of the first strip, means to punch slots in said strips and means to cut off a portion of the end of each of said strips, the cutter acting to complete the assembling of said strips with the first strips to produce a completed filler.

6. A machine for producing packing case fillers, comprising feed rolls, corrugating rolls, slot punching dies through which the paper strips are passed, means to turn the strips so they will lie in parallel planes, and means to assemble with said strips other slotted strips of paper which are cut off to produce the completed filler.

7. A machine for producing packing case fillers, comprising corrugating rolls, punches to produce two series of slots at one time, rolls to turn paper strips passed through the first rolls in one plane to lie in parallel planes, corrugating rolls through which two paper strips are passed substantially at right angles to the line of motion of the first paper strips, means to punch a series of slots in each of the latter paper strips to register with the slots of the first paper strips the feed movement of the latter strips being arranged to bring the slots of the several strips into register whereby the feed movement assembles the several strips in a completed whole and means to cut off the vertically fed strips two at a time.

8. A machine for producing packing case fillers, comprising means to feed strips of paper, means to corrugate and punch the paper strips and means to corrugate, punch and assemble other strips of paper at right angles to the first strip and in conjunction therewith to produce a complete packing case filler.

9. An apparatus of the class described, comprising paper strips feeding rolls, means to split the paper into narrow strips, means to corrugate the several strips of paper produced, means to punch said paper strips two series at a time, and means to produce one series of punchings in said strips at predetermined intervals.

10. A machine of the class described, comprising feed rolls to receive a strip of paper, means to split the paper strip into a series of strips, means to corrugate and punch the paper strips, other means to corrugate and punch two sets of paper strips to be assembled two at a time with the first strips, and means to assemble one of the latter strips with the first strips at predetermined intervals.

11. A machine of the class described, comprising means to feed a series of corrugated and slotted paper strips, means to corrugate and punch two paper strips at a time. over the first strips, means to advance the latter strips so that their lower edges will be assembled with the first strips and means to cut off the lower ends of the latter two strips to produce the completed filler.

12. A machine of the class described comprising rolls to feed corrugated and punched paper strips, other rolls to feed and corrugate two paper strips extending at right angles to the line of movement of the first strips, means to punch the latter strips, means to advance the latter strips into engagement with the first strips, and means to thereupon cut off the lower ends of the latter strips when assembled with the first strips to produce the completed filler.

13. A machine of the class described, comprising rolls to feed corrugated and punched paper strips, other rolls to feed and corrugate paper strips, whose line of movement is substantially at right angles to the first strips, means to punch the second strips, means to cut off the second strips when assembled with the first strips and transversely movable knives adapted to cut off the first strips at predetermined intervals.

14. In a machine of the class described, comprising a series of feed recessed feed rolls adapted to feed a plurality of corrugated paper strips, other rolls to feed and corrugate two paper strips whose line of movement is at right angles to the line of movement of the first paper strips, means to punch the latter strips, means to remove the punchings from the machine and means to cut off the lower end of the paper strips when they are assembled with the first paper strips.

15. A machine of the class described, comprising feed rolls adapted to receive a strip of paper, means to transversely corrugate the paper strip, punches arranged in two series to produce slots in the paper strips, means to operate said punches together the predetermined number of times, and means to then operate one of said series of punches and means to assemble other corrugated strips with the first strips at right angles thereto to produce a completed packing case filler.

16. In a machine of the class described, means to punch and cut a series of paper strips, means to effect the punching operations two at a time, and then singly on the series of strips, means to punch and cut off a pair of strips moving at right angles to the other strips, and means to cut and advance one only of said strips whereby a set of case fillers of an odd number each way may be made in four operations.

17. A machine of the class described, comprising a pair of rolls adapted to receive paper from a roll, rotary knives for cutting said paper into a series of strips, corrugated rolls for feeding and corrugating said strips, means for driving said corrugated rolls with an intermittent stop motion, means for punching slots in the edges of said strips, vertical feed rolls adapted to receive the corrugated strips at the same speed they come from the corrugating rolls, corrugations in said vertical feed rolls adapted to mesh with the corrugations in said strip, means for cutting off said strips in predetermined lengths.

18. A machine of the class described, comprising rolls for receiving a strip of paper, rotary knives for cutting said paper into a series of narrow strips, rolls for corrugating said strips transversely, punches and dies for cutting slots in said narrow strips, rolls for turning said narrow strips to a vertical position, rolls for receiving two strips of paper vertically, rolls for corrugating said strips longitudinally, punches and dies for slotting said strips, means for cutting off and interlocking said horizontal and vertical corrugated strips.

In testimony whereof I have hereunto set my hand this 23rd day of August A. D. 1923.

WILLIAM E. SCHENDEL.